(No Model.)

A. C. DAVIDSON.
PNEUMATIC TIRE FOR BICYCLES.

No. 531,436. Patented Dec. 25, 1894.

Witnesses.
W. F. Matthews.

Inventor
A. C. Davidson
By James J. Sheehy
Attorney.

UNITED STATES PATENT OFFICE.

ANDREW C. DAVIDSON, OF ST. THOMAS, CANADA.

PNEUMATIC TIRE FOR BICYCLES.

SPECIFICATION forming part of Letters Patent No. 531,436, dated December 25, 1894.

Application filed July 6, 1894. Serial No. 516,759. (No model.) Patented in Canada July 26, 1894, No. 46,671.

*To all whom it may concern:*

Be it known that I, ANDREW C. DAVIDSON, a citizen of Canada, residing in the city of St. Thomas, in the county of Elgin, in the Province of Ontario, Canada, have invented a new and useful Improvement in Pneumatic Tires for Bicycles and other Vehicles, (for which I have obtained a patent in Canada, dated July 26, 1894, No. 46,671,) of which the following is a specification.

My invention relates to improvements in pneumatic tires in which two levers operate in conjunction with the retaining wires which are incased in either edge of the outer cover, and the objects of my improvements are first, to provide a cheap and simple attachment which will enable the outer-cover and air-tube of a pneumatic tire to be easily attached to and detached from the rim of the wheel; second, to provide a means of enlarging or reducing the circumference of the outer-cover and retaining wires of a pneumatic tire; and third, to afford facilities for holding the retaining wires of a pneumatic tire in alignment with the rim of the wheel on which it is placed. I attain these objects by the mechanism illustrated in the accompanying drawings, in which—

Figure 1:
Figure 2:
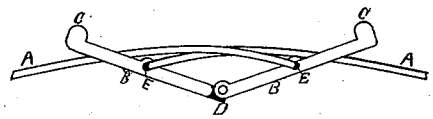
Figure 3:
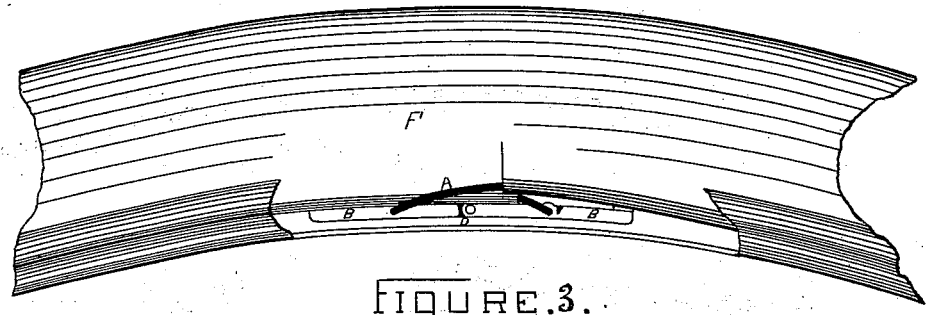

Figure 1, is an inside elevation of my invention with the retaining wires attached. Fig. 2, is a reverse side elevation of the same. Fig. 3, is a side elevation of the outer cover of a pneumatic tire, with the retaining wires exposed and showing my invention attached thereto.

Similar letters refer to similar parts throughout the several views.

A, A, are the retaining wires which are incased in the edges of the outer-cover, and being so nearly the circumference of the wheel to which the tire is fitted, as to render the removal of the tire impossible without enlarging the circumference of the said wires.

B, B, are levers jointed at D, to which the retaining wires are secured at E, E. These levers are provided with lugs or clips C, C, at their outer ends, and when opened as in Fig. 1, conform to the curvature of the periphery of the wheel to which the tire is fitted.

F, is the outer-cover or case for the air-tube made of rubber and canvas or other suitable materials, in the edges of which the retaining wires are incased.

In Fig. 1, the wires and levers are shown detached from the outer-cover, but in the position they would occupy if the outer-cover and wires were in place on the rim of the wheel, the wires and levers being held in alignment with the rim, by their points of contact at E, E, and the lugs or clips C, C.

Fig. 2, shows the wires and levers as they appear when the circumference of the wires and outer-cover is enlarged to facilitate the removal of the tire from the rim, which is accomplished by raising the extremities of the levers.

In Fig. 3, is shown the outer-cover with the wires and levers in position, the wires passing through an eyelet in the outer-cover, crossing each other and joining the lever at or near the center of each section thereof, and the lugs or clips resting between the outer-cover and the rim of the wheel.

To remove my tire from the rim of the wheel, deflate the air-tube, raise the ends of the levers, and the circumference of the outer-cover is sufficiently enlarged to easily remove the tire.

To replace the tire, place one edge of the outer-cover in position on the rim, press the ends of the levers B. B. down to the rim, insert the air-tube, and repeat the operation with the other edge of the outer-cover; inflate the air-tube and the tire is ready for use.

Having fully described my invention, what I claim, and desire to secure by Letters Patent, is—

The combination of the levers B, having their contiguous ends pivotally connected together and provided at their outer or free ends with lugs C, and the securing wire A, having its ends connected to the levers B, at intermediate points in the length of the same, substantially as and for the purpose set forth.

ANDREW C. DAVIDSON.

Witnesses:
LIZZIE DAVIDSON,
JOHN B. DAVIDSON.